United States Patent
Möller et al.

(10) Patent No.: US 11,131,683 B2
(45) Date of Patent: Sep. 28, 2021

(54) MULTI-CHANNEL PIPETTOR AND METHOD FOR OPERATING A MULTI-CHANNEL PIPETTOR

(71) Applicant: Analytik Jena AG, Jena (DE)

(72) Inventors: Eva Möller, Jena (DE); Heiko Oehme, Jena (DE); Marcel Zade, Jena (DE); Stefan Neugebauer, Jena (DE)

(73) Assignee: Analytik Jena GmbH, Jena (DE)

( * ) Notice: Subject to any disclaimer, the term of this patent is extended or adjusted under 35 U.S.C. 154(b) by 348 days.

(21) Appl. No.: 16/225,223

(22) Filed: Dec. 19, 2018

(65) Prior Publication Data

US 2019/0187166 A1 Jun. 20, 2019

(30) Foreign Application Priority Data

Dec. 20, 2017 (DE) ...................... 10 2017 130 738.9

(51) Int. Cl.
*G01N 35/10* (2006.01)
*B01L 3/02* (2006.01)

(52) U.S. Cl.
CPC ........ *G01N 35/1072* (2013.01); *B01L 3/0237* (2013.01); *G01N 35/109* (2013.01); *G01N 35/1011* (2013.01); *G01N 35/1065* (2013.01); *G01N 35/1074* (2013.01);
(Continued)

(58) Field of Classification Search
None
See application file for complete search history.

(56) References Cited

U.S. PATENT DOCUMENTS 4,478,094 A 10/1984 Salomaa et al.
5,245,530 A * 9/1993 Taki ...................... G01N 35/109
141/130
(Continued)

FOREIGN PATENT DOCUMENTS

DE 4113377 A1 10/1991
EP 0555739 A1 8/1993

OTHER PUBLICATIONS

Search Report for German Patent Application No. 10 2017 130 738.9, German Patent Office, dated Sep. 10, 2018, 7 pp.

*Primary Examiner* — Kathryn Wright
(74) *Attorney, Agent, or Firm* — Mark A. Logan; Endress+Hauser (USA) Holding Inc.

(57) ABSTRACT

The present disclosure relates to a method for operating a multi-channel pipettor, comprising: creating an access plan having a plurality of transfer blocks, each comprising a source access and a destination access, wherein the creating includes: reading of position lists which contain the positions of all source and destination containers and assigning source containers to destination containers; performing a transfer analysis in which the source or destination accesses and the movements of the pipetting head and/or the container holders are determined by forming the difference between the current channel position and the source position or the destination position on the two-dimensional plane; and performing a transfer optimization, whereby the source or destination accesses and the movements of the pipetting head respectively required for the source or destination accesses are sorted into the transfer blocks; and operating the multi-channel pipettor on the basis of the created access plan.

15 Claims, 5 Drawing Sheets

(52) U.S. Cl.
CPC ............ *B01J 2219/00315* (2013.01); *B01J 2219/00364* (2013.01); *G01N 2035/103* (2013.01)

(56) References Cited

U.S. PATENT DOCUMENTS

| | | | | |
|---|---|---|---|---|
| 5,443,792 | A | * | 8/1995 | Buhler ............ G01N 35/109 422/106 |
| 2004/0005714 | A1 | | 1/2004 | Safar et al. |
| 2009/0235764 | A1 | * | 9/2009 | Ganz ............ G01N 35/1065 73/864.81 |
| 2013/0029856 | A1 | * | 1/2013 | Kelso ............ G01N 35/028 506/7 |
| 2016/0139166 | A1 | * | 5/2016 | Berberich ........ G01N 35/1016 435/6.12 |
| 2016/0320424 | A1 | | 11/2016 | Antonio et al. |

* cited by examiner

MULTI-CHANNEL PIPETTOR AND METHOD FOR OPERATING A MULTI-CHANNEL PIPETTOR

CROSS-REFERENCE TO RELATED APPLICATION

The present application is related to and claims the priority benefit of German Patent Application No. 10 2017 130 738.9, filed on Dec. 20, 2017, the entire contents of which are incorporated herein by reference.

TECHNICAL FIELD

The present disclosure relates to a multi-channel pipettor, which has a pipetting head with a plurality of channels and at least one container holder with a plurality of source and destination containers. The present disclosure furthermore relates to a method for operating the multi-channel pipettor.

BACKGROUND

Multi-channel pipettors—also called pipetting platforms—are used for the fully automatic, single- to multi-channel transfer of liquid samples from source containers into destination containers. These multi-channel pipettors are used for automated sample-handling tasks in order to accelerate the transfer of the individual samples and to carry it out in a reproducible manner. Such a multi-channel pipettor can be individually adapted to the needs and the applications of the operator.

The applicant fabricates and sells several such multi-channel pipettors under the product name, CyBio®—for example, the CyBio® FeliX and the CyBio® SELMA.

Nowadays, there is the problem that complex transfer tasks are achieved with little efficiency. Complex transfer tasks are, for example, hit picking or normalization of samples. In this case, individual source and/or destination containers are controlled specifically to transfer samples or other liquids between them. The containers can be arranged in a fixed grid or without a fixed grid. The known solutions have so far been in the construction of flexible pipetting tools (e.g., with individually lowerable channels and/or a fixed, equidistant or non-equidistant span of the pipetting channels) and in the device enlargement of the multi-channel pipettors, in order to ensure that all pipetting channels can reach all source and destination containers. Especially preferred are multi-channel pipettors with a manageable number of channels, but a high flexibility with regard to the mobility and arrangement of the channels.

SUMMARY

Starting from this problem, the present disclosure is based upon the aim of specifying a method that allows efficient performance of complex transfer tasks for a multi-channel pipettor, regardless of the hardware characteristics of the multi-channel pipettor.

The aim is achieved by a method for operating a multi-channel pipettor, which multi-channel pipettor has a pipetting head and at least one first container holder having a plurality of source containers and a second container holder having a plurality of destination containers, or a third container holder having a plurality of source and destination containers, wherein the pipetting head has a plurality of channels, which are arranged in a matrix and are preferably designed to receive pipette tips, wherein the first dimension of the matrix preferably has a larger number of channels than the second dimension of the matrix, and wherein the pipetting head and/or container holders can be moved relative to one another in a two-dimensional plane defined by a first movement direction in the first dimension of the matrix and a second movement direction in the second dimension of the matrix, and in a third movement direction intersecting the two-dimensional plane, comprising:
  a. creating an access plan, wherein the access plan has a plurality of transfer blocks, wherein each of the transfer blocks defines for at least one of the channels at least one source access, in which the channel moves to a source position on the two-dimensional plane and receives a defined amount of liquid from one of the source containers, and at least one destination access, in which the channel moves to a destination position on the two-dimensional plane and delivers the defined amount of liquid to one of the destination containers of the second container holder, wherein the following steps are performed to create the access plan:
    i. reading of position lists, which include the local positions of all source and destination containers;
    ii. performing a transfer analysis in which the source or destination accesses and the movements of the pipetting head and/or the container holders required for an access are determined by forming the difference between the current channel position and the source position, or the destination position, on the two-dimensional plane;
    iii. performing a transfer optimization, whereby the source or destination accesses and the movements of the pipetting head respectively required for the source or destination accesses are sorted into the transfer blocks;
  and
  b. operating the multi-channel pipettor on the basis of the created access plan, wherein the multi-channel pipettor processes in succession the transfer blocks contained in the access plan.

By means of the method according to the present disclosure, a more efficient and faster transfer of liquids is possible, even with complex transfer tasks. An efficient use of a multi-channel pipettor is made possible, since an access or transfer plan is calculated in advance. The transfer analysis and optimization associated with the access plan lead to the result that transfer tasks which would otherwise not be feasible on account of hardware limitations of the multi-channel pipettor can also be performed. The goal of transfer optimization is to achieve a high efficiency of a multi-channel pipettor, as compared to a single-channel pipettor. The highest efficiency is achieved if the largest possible number of samples is transferred in one transfer block, and the length of the movement path is minimized.

An assignment of source to destination containers is, optionally, performed in the step of reading in the position lists. It can also be provided that an access plan include the interim accommodation of pipette tips.

The channels of the pipetting head may be designed such that they can accommodate pipette tips. Alternatively, the channels may include fixed pipette tips or cannula-like liquid transfer devices—for example, needles.

It can be provided that the pipetting head also have a symmetric matrix, in which the channels are arranged. This can here also be a 1×1 matrix.

The pipetting head can be designed in such a way that, in addition or as an alternative to the movement of the pipetting head in the third movement direction, individual channels can be moved in the third movement direction. The channels in such a case of an N×1 or 1×N arrangement are designed to be spreadable, equidistantly or non-equidistantly.

The container holders are, especially, microtiter plates which have 96 or 384 containers, or tube racks of comparable geometry. Alternatively, the container holder has containers with flexible geometry. Accordingly, the pipetting head may be designed to have up to 384 channels.

If the channels are positioned on the circle in a pipetting head, the source and destination positions, the current positions of the channels, and the differences between the positions can, alternatively, also be determined in polar coordinates.

The creation of the access plan can be carried out by the multi-channel pipettor itself, which has control electronics and an operating unit. Alternatively, the access plan is created by an external operating unit and transferred to the multi-channel pipettor.

An advantageous development of the method according to the present disclosure provides that it be checked in the course of the transfer analysis whether each of the source and destination containers can be reached by each of the channels by respectively moving the pipetting head and/or the container holders in the first movement direction and in the second movement direction. A spatial limitation, in which not every source or destination container of each channel can be reached, occurs, for example, in smaller laboratory automations.

A particularly advantageous embodiment of the method according to the present disclosure provides for the number of transfer blocks in the access plan to be formed from the quotient of the number of destination containers and the number of channels in the event that each of the source and destination containers can be reached by each of the channels by respectively moving the pipetting head and/or the container holders in the first movement direction and in the second movement direction. This is referred to as free transfer.

A particularly advantageous embodiment of the method according to the present disclosure provides that, in the event that not each of the source and destination containers can be reached by each of the channels by respectively moving the pipetting head and/or the container holders in the first movement direction and in the second movement direction, a list be created in each case for all source and destination containers, the list respectively containing those channels from which the respective source or destination container can be reached, wherein the number of channels listed in a list is assigned to the respective source or destination container as a reachability index. It is provided that a source container may be served only by channels which can also reach the associated destination container. Source or destination containers that cannot be reached by any channel and channels that cannot reach any destination are not included in the list.

A preferred embodiment of the method according to the present disclosure provides that source and/or destination containers which have a reachability index below a predetermined magnitude are respectively assigned to one of the channels included in the respective list of source and/or destination containers.

An advantageous development of the method according to the present disclosure provides that, for source and/or destination containers that are dimensioned in such a manner that a simultaneous source or destination access of several channels can take place, a minimum and a maximum container extension in each of the two movement directions be determined in the course of the transfer analysis. The efficiency achieved by the transfer optimization is increased if simultaneous accesses, i.e., simultaneous accesses of several channels, into a container can occur as often as possible.

A preferred embodiment of the method according to the present disclosure provides that, in the second movement direction, access positions be determined in which at least two of the source and/or destination containers which allow simultaneous source or destination access of several channels overlap. The number of transferred samples in a transfer block is thereby increased.

An advantageous embodiment of the method according to the present disclosure provides that, in the first movement direction, access positions be determined, by means of which each container can be reached simultaneously by at least one predetermined subset of channels adjacent in the first direction.

An advantageous embodiment of the method according to the present disclosure provides that, in the course of the transfer optimization for each of the source and/or destination containers which allow simultaneous source or destination access of several channels, a centroid position and a tolerance range be respectively calculated in the first movement direction and in the second movement direction, wherein the centroid position represents the center of the distance between the minimum and maximum container extensions in a movement direction, and wherein the tolerance range represents half the difference between the maximum and minimum container extensions in a movement direction.

A preferred embodiment of the method according to the present disclosure provides that it be checked for each of the channels whether, in the first and in the second movement directions, the distance between the current channel position and the centroid position of the containers from an access position respectively smaller than the tolerance range, wherein only those access positions for which this is the case are sorted into the transfer blocks.

An advantageous development of the method according to the present disclosure provides that the pipetting head be fitted in advance with a number of pipette tips that is smaller than the number of channels. Access optimization for a multi-channel pipettor, in which all channels can only be lowered, i.e., moved in the third movement direction, simultaneously, can thereby be achieved.

A preferred embodiment of the method according to the present disclosure provides that, for each access position in the second movement direction, a number of reachable source and destination containers be determined for each of the channels by means of movement of the pipetting head or the container holder in the first movement direction.

A preferred embodiment of the method according to the present disclosure provides that the access position in the second movement direction with the respectively highest number of possible source or destination accesses be respectively determined via the first movement direction for the source and destination containers, wherein the access position determined for the source access is assigned to the access position determined for the destination access, and these accesses are sorted into a transfer block, wherein the number of possible source or destination accesses in the access positions is identical.

An advantageous embodiment of the method according to the present disclosure provides that the method steps of determining the access positions with the highest number of source or destination accesses and the assignment be repeated until it is no longer possible to assign access positions with identical numbers of possible source and destination accesses, in which case the access positions with the respectively highest number of source accesses are assigned to the access positions with the respectively highest number of destination accesses.

The aim is, moreover, achieved by a multi-channel pipettor designed to carry out the method according to the present disclosure.

BRIEF DESCRIPTION OF THE DRAWINGS

The present disclosure is explained in greater detail with reference to the following figures. Shown are.

DETAILED DESCRIPTION

Figure 1:
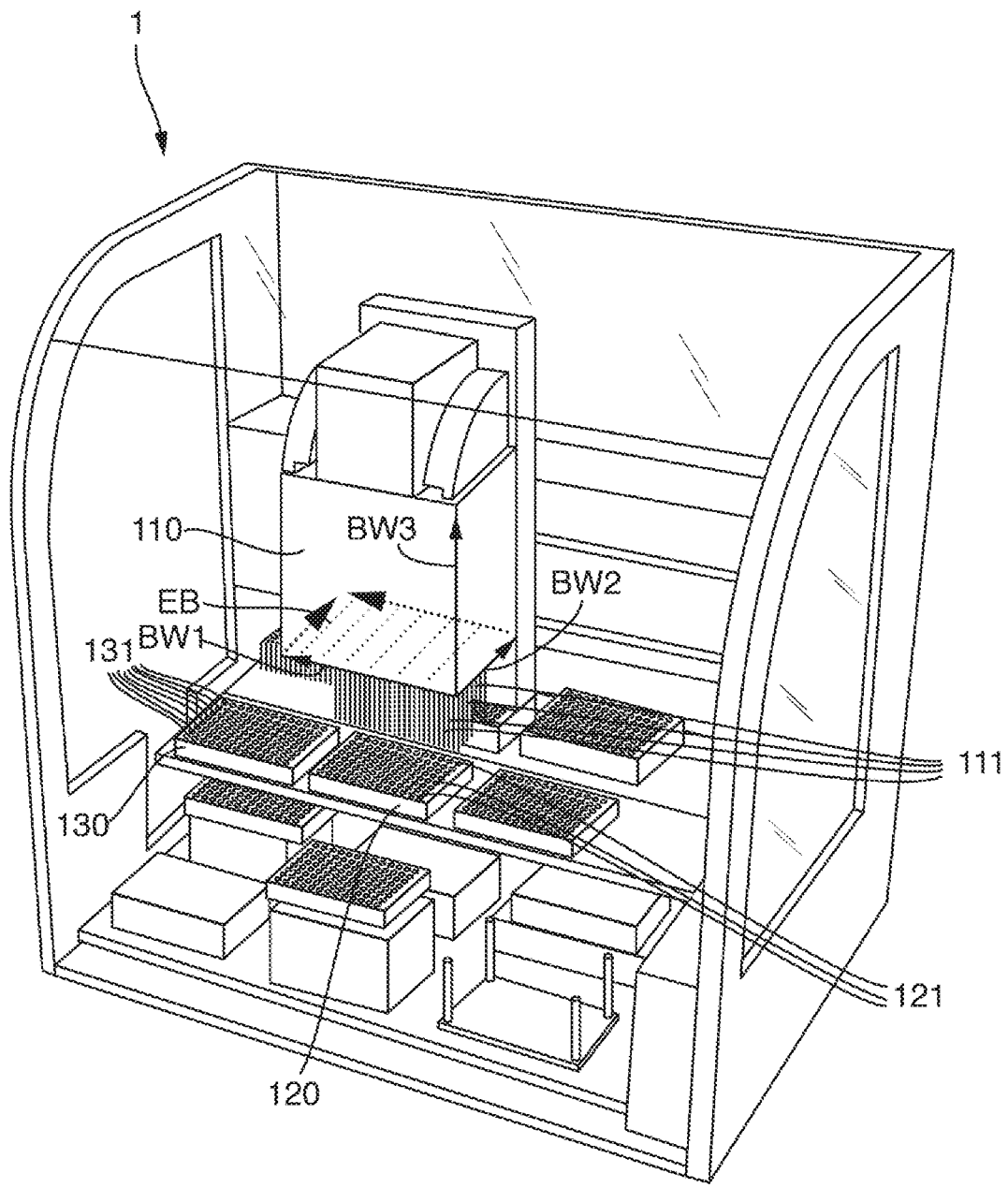
FIG. 1 shows an exemplary embodiment of a multi-channel pipettor designed to carry out the method according to the present disclosure.

FIG. 1 shows a multi-channel pipettor 1 as known from the prior art. The multi-channel pipettor 1 has a pipetting head 110. A plurality of channels 111 is arranged on the pipetting head 110. In this embodiment, the channels 111 are arranged in a matrix and designed to accommodate pipette tips. The first dimension of the matrix has a larger number of channels than the second dimension of the matrix.

Alternatively, the channels 111 may have fixed pipette tips or needles. It may also be provided that the pipetting head 110 have a symmetric matrix, in which the channels 111 are arranged. This can here also be a 1×1 matrix.

The multi-channel pipettor 1, moreover, has at least one first container holder 120 with a plurality of source containers 121 and a second container holder 130 with a plurality of destination containers 131. The container holders are, especially, microtiter plates which have 96 or 384 containers. Accordingly, the pipetting head is designed to have up to 384 channels 111.

The multi-channel pipettor 1 is designed such that the pipetting head 110 and/or the container holders 120, 130 can be moved relative to one another in a two-dimensional plane EB defined by a first movement direction BW1 in the first dimension of the matrix—also called AC ("along the comb") direction—and a second movement direction BW2 in the second dimension of the matrix—also called TC ("to the comb") direction—and a third movement direction BW3 intersecting the two-dimensional plane.

In the event that the pipetting head 110 has an N×1 or 1×N matrix arrangement of the channels, the pipetting head 110 may be designed such that, in addition to the movement of the pipetting head 110 in the third movement direction BW3, individual channels 111 are movable in the third movement direction BW3. In such a case of an N×1 or 1×N arrangement, the channels 111 may be designed to be spreadable, equidistantly or non-equidistantly.

By means of the method according to the present disclosure, a more efficient and faster transfer of liquids is possible, even with complex transfer tasks. An efficient use of a multi-channel pipettor 1 is made possible, since an access or transfer plan is calculated in advance. The automatic transfer analysis and optimization associated with the access plan lead to the result that transfer tasks which would otherwise have to be calculated on account of hardware limitations of the multi-channel pipettor 1 can also be performed.

In the following, three examples for creating an access plan by means of the method according to the present disclosure are described:

Example 1

Hit-Picking with Flexible Channel Access

In this respect, a distinction is made between two cases: transfer of samples without spatial constraint and transfer with spatial constraint.

In the case of a transfer without spatial constraint, the access plan can be created independently for the source and destination containers 121, 131. The number of transfer blocks results from the quotient of the number of destination containers 131 and the number of channels 111. The relevant access positions in the first movement direction BW1 and in the second movement direction BW2 result from the distances between the channel and destination positions in the respective direction. When determining the reachability of a container from a position in the first or second movement direction BW1, BW2, it is checked whether the distance between the position of a channel 111 and the central position of a container 121, 131 in the respective direction is equal to the position value of the access point. The access points are visited in succession in the second movement direction BW2. In the first movement direction, all positions from which at least one container 121, 131 is reachable are checked, and the access sequence with the least demand with respect to the number of accesses and the path length is determined by the complete search.

Figure 4:
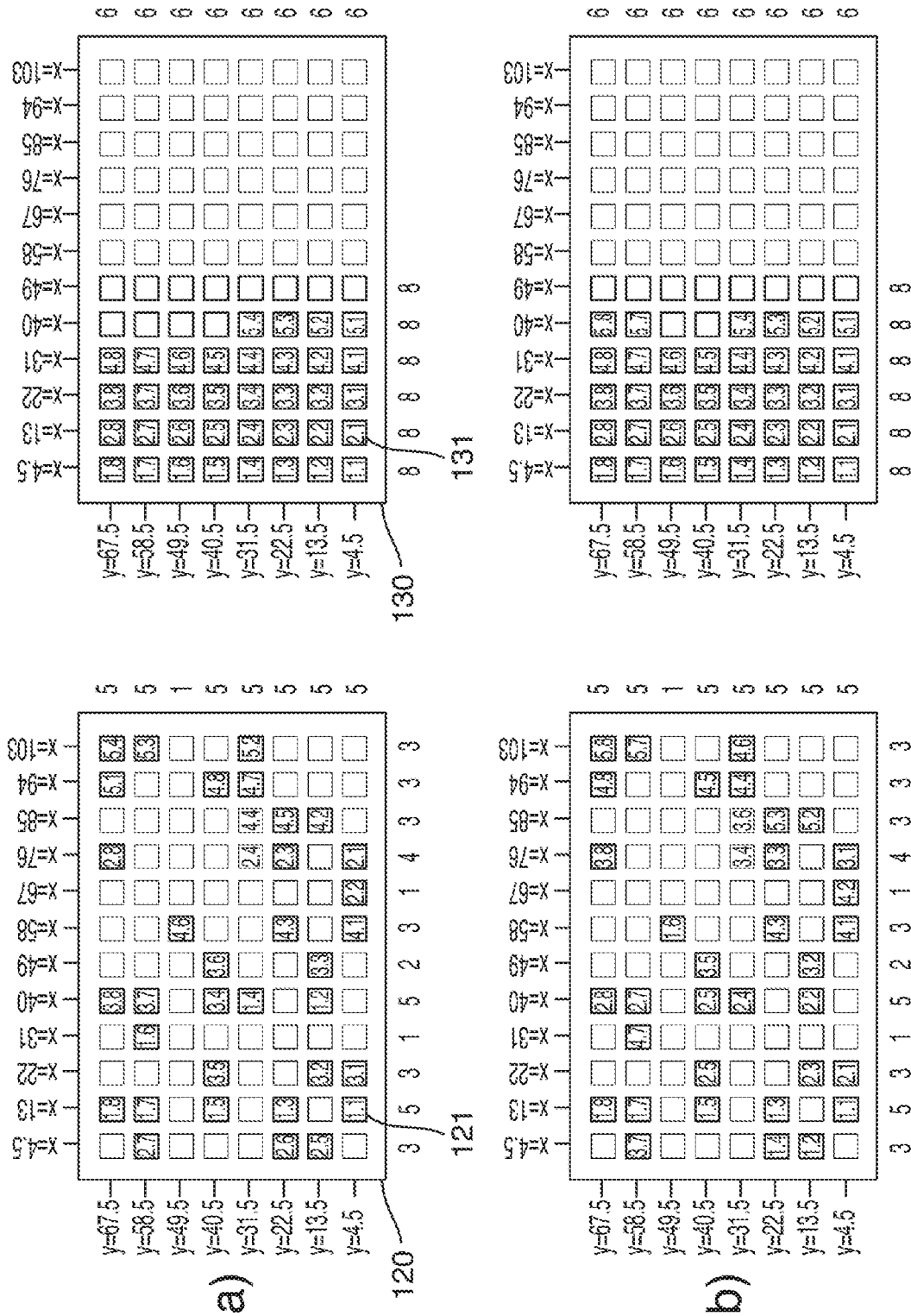
FIG. 4A shows an exemplary transfer plan for a transfer without spatial limits.
FIG. 4B shows an exemplary transfer plan for a free transfer with spatial limits.
FIG. 4C shows an exemplary transfer plan for a linked transfer without spatial limits.
FIG. 4D shows an exemplary transfer plan for a linked transfer with spatial limits.
Figure 4:
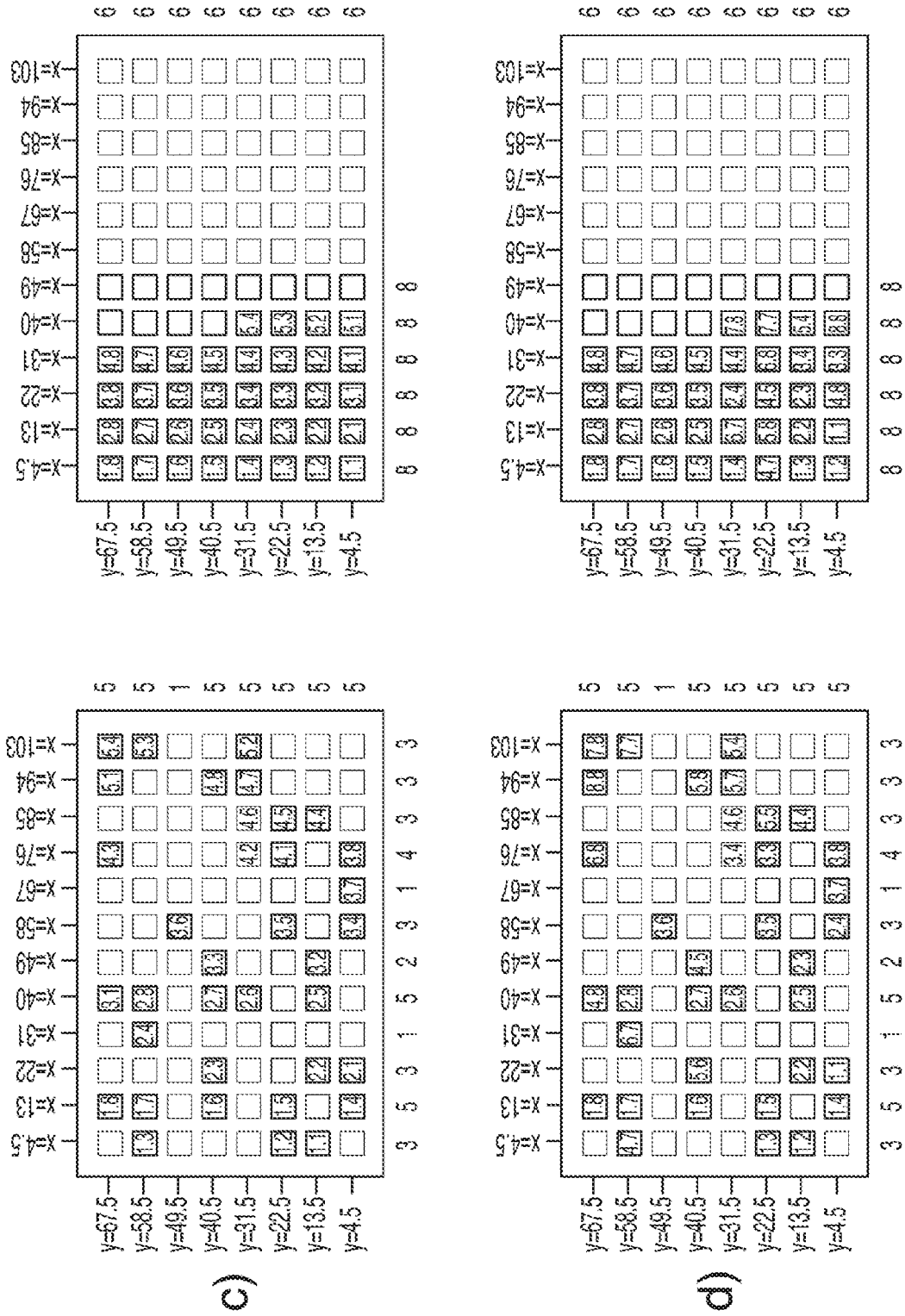

An exemplary transfer plan for a transfer without spatial limits is shown in FIG. 4A. The left side shows the first container holder 120 with the source containers 121; the right side shows the second container holder 130 with the destination containers 131. Each of the samples to be transferred from the source containers 121 is provided with a number. The first index corresponds to the transfer block in which the sample is transferred. The second index corresponds to the channel 111 determined for the transfer by means of the method described above. The samples after the transfer are illustrated in the second container holder 130. The destination containers 131 with a black border in this case represent those destination containers which may be used for the transfer. For the complete transfer of all samples, five transfer blocks are required. To this end, the pipetting head 110 needs 18 accesses to the first container holder 120 and 5 accesses to the second container holder 130.

In a linked transfer, it is assumed that a sample of the first source position is transferred to the first destination position, etc. In this case, a primary access is determined according to the previously described method. During successive access, the samples received are delivered in succession into the already predetermined transfer blocks. In doing so, access in the first movement direction BW1 is performed in an optimized manner, and the content of a channel 111 that was determined in the primary access is at the same time compared to the index of the destination position. The primary access (either source or destination) is selected according to the higher average samples density per access point in the second movement direction BW2, since a higher access success is to be expected in this case, and optimization can be more effective.

An exemplary transfer plan for a linked transfer without spatial limits is shown in FIG. 4C. For the complete transfer of all samples, five transfer blocks are required. To this end, the pipetting head 110 needs 27 accesses to the first container holder 120 and 5 accesses to the second container holder 130.

In the case of a transfer with spatial constraint, access positions in the first movement direction BW and in the second movement direction BW2 resulting from the distances between the channel positions and positions of the source and destination containers 121, 131 are checked with regard to the reachability limits in the first and second movement directions (BW1, BW2). In addition, source and destination containers (121, 131) which cannot be reached by any channel and channels which do not reach any source or destination containers (121, 131) are removed from the optimization set. For all source and destination containers (121, 131), lists of the channels (111) by which they can be reached are determined. The length of the list is assigned to each source and destination container (121, 131) as a so-called reachability index. These steps are performed independently for source and destination positions. The aim of the optimization is to maximize the number of samples in the transfer block, and thus to minimize the total number of transfers. If individual source and destination containers (121, 131) can be reached only by one and the same channel, their number yields the lowest transfer block number NBo.

A purposeful arrangement of the access points in the second movement direction (BW2) is used to preferably assign source and destination containers (121, 131), which are only reached by a few channels (111), to one channel (111). For this purpose, the smallest reachability index of the source and destination containers (121, 131) reachable from the associated position in the second movement direction (BW2) is determined for each access point in the second movement direction (BW2). The ascertained values are arranged in ascending order. The minimum number of transfer blocks NB (but not less than NBo) is determined from the quotient of the number of source and destination containers (121, 131) and the number of channels (111). The sorted positions in the second movement direction (BW2) are re-sorted row-by-row into a matrix with NB columns. Lastly, the matrix is transferred column-by-column into a vector, which provides the final ranking of the positions in the second movement direction (BW2). If uTC is the rank of an access point sorted by the minimum access index, the final access rank can be calculated from the following formula:

$$r(u_{TC}) = (u_{TC} - 1)\left[\frac{N_{TC}}{N_B}\right] - \left(\left[\frac{u_{TC}}{N_B}\right] - 1\right)\left[\frac{N_{TC}}{N_B}\right]N_B + \left[\frac{u_{TC}}{N_B}\right]$$

A linked transfer with spatial constraint is in principle optimized like a transfer without spatial constraint. In the primary access, the prioritization in the second movement direction (BW2) is performed according to reachability. For the access optimization in the direction of the first movement direction (BW1), a number of the channels (111) which enable access both to the source and to the destination position is determined per sample to be transferred. In the complete search, only channels (111) of this list are taken into account. No adaptation is required for successive access.

An exemplary transfer plan for a linked transfer with spatial limits is shown in FIG. 4D. For the complete transfer of all samples, five transfer blocks are required. To this end, the pipetting head 110 needs 29 accesses to the first container holder 120 and 19 accesses to the second container holder 130. This variant represents the most demanding transfer.

In the case of a free transfer with spatial constraint, optimization takes place block-by-block, i.e., individually for each transfer block. In the source access, which is executed primarily, only channels (111) are taken into account which can also reach a relevant position in the destination access. After all channels (111) have been assigned primarily, successive assignment of the channels (111) used takes place. In both routines, the positions in the second movement direction (BW2) are sorted by reachability.

An exemplary transfer plan for a free transfer with spatial limits is shown in FIG. 4B. For the complete transfer of all samples, five transfer blocks are required. To this end, the pipetting head 110 needs 18 accesses to the first container holder 120 and 5 accesses to the second container holder 130.

Example 2

Transfer with Simultaneous Access of Several Channels into a Source or Destination Container (121, 131)

Figure 2:
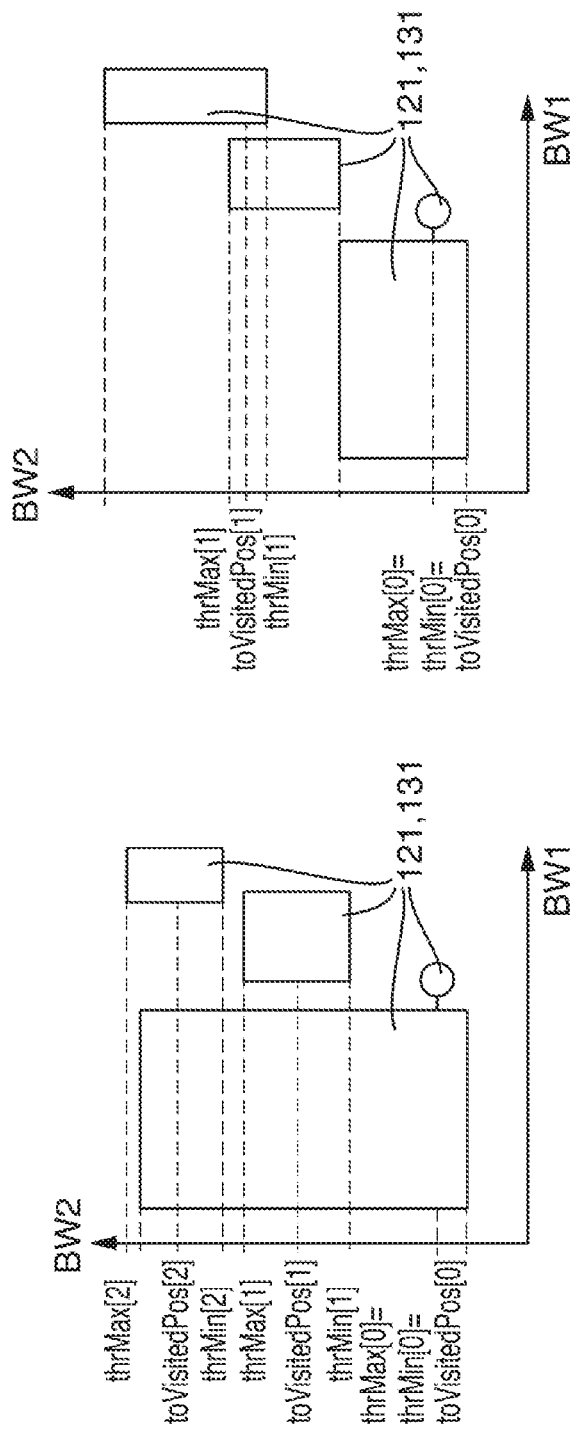
FIG. 2 shows an illustration of a method, by means of which spatial container extensions are determined, for simultaneous access of several channels to the containers.

For containers (121, 131) for which simultaneous access of several channels (111) is possible and also desired, the access positions are determined from the spatial container extension by evaluating the minimum and maximum container positions in the respective movement direction (BW1, BW2) with respect to an access. The minimum number of access positions is determined for the second movement direction (BW2) so that each container (121, 131) is reached. The procedure is illustrated in FIG. 2 for two examples. In this case, the minimum container extension thrMin and maximum container extension thrMax of each container (121, 131) are sorted by size, and overlapping areas are removed. Accordingly, toVisitedPos positions are determined, which simultaneously overlap as many containers (121, 131) as possible.

Figure 3:
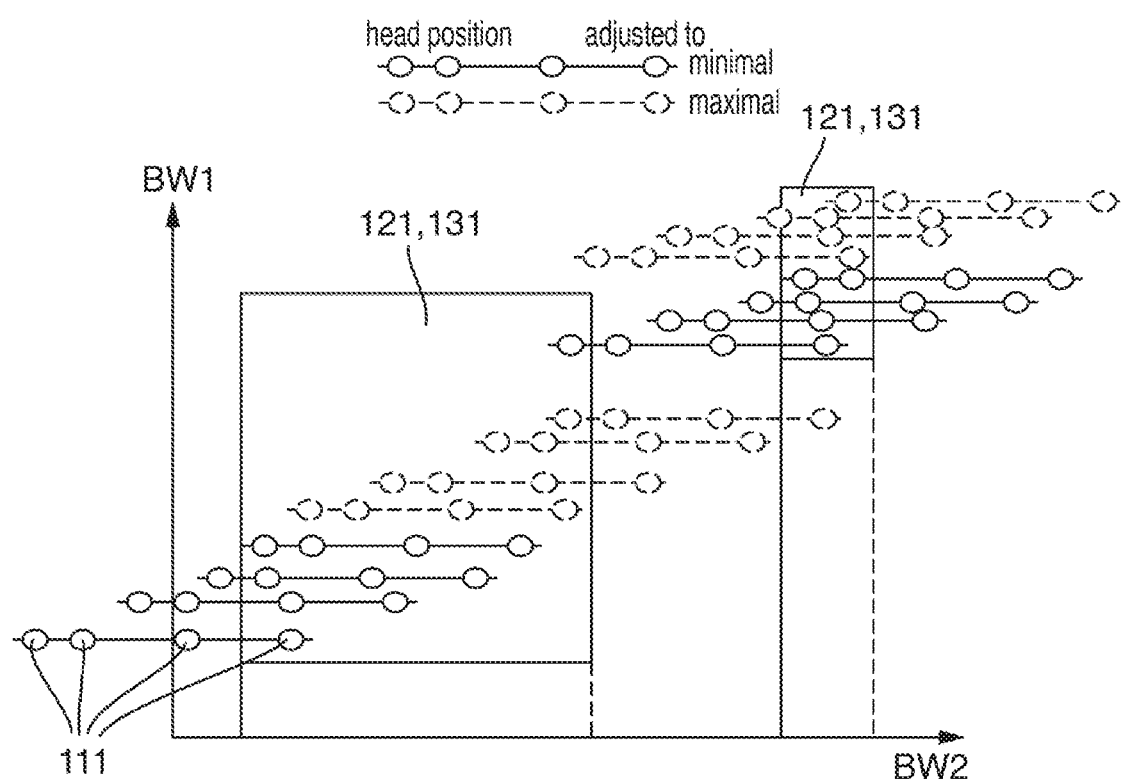
FIG. 3 shows an illustration of a method for determining relevant locations for simultaneous access of several channels to the containers.

Access positions for the first movement direction are determined, so that each container (121, 131) is reached simultaneously by each subset of adjacent channels (111) to the extent permitted by the container extension. All relevant locations for containers (121, 131) and channels (111) positioned in the grid are thereby ascertained. The procedure is illustrated in FIG. 3. In this case, the pipetting head 110 is moved in a simulated manner in both movement directions BW1, BW2 over the containers 121, 131, and positions are sought in which a largest possible number of channels 111 can simultaneously access a container 121, 131.

In order to optimize the accesses according to the previously introduced scheme, the positions of the containers (121, 131) are transferred into their centroid (meanPos) and tolerance range (tolerance) in the respective direction:

meanPos=(thrMax+thrMin)/2 tolerance=(thrMax−thrMin)/2

In the determination of the reachability of a container (121, 131) from a position in the first or second movement direction (BW1, BW2), it is checked whether a channel (111) is within the tolerance range (tolerance) of the container (121, 131), i.e., whether the distance between the channel position and the central container position (mean-Pos) from the position value of the access point in the respective direction is smaller than the tolerance value (tolerance). Thus, all algorithms already mentioned can, in principle, also be applied to simultaneous accesses into a container. A corresponding adjustment is performed in the optimization of the access in the second movement direction (BW2).

The method initially assumes that access into a container (121, 131) can be repeated as often as desired. In the case of a limitation due to the volumetric capacity, an access counter may be taken into account, wherein a container (121, 131) is removed from the optimization after the number of accesses has been performed. In fact, when determining the access points, repeated input positions are implicitly removed. If multiple access into point containers is to take place, this access can likewise be controlled using counters. If all of the containers (121, 131) are designed as point containers, the method does not check for duplicates.

Example 3

Transfer Optimization in Case of Collective Access

The flexibility of a multi-channel pipettor (1), in which the channels (111) are only simultaneously lowered, can be achieved by a clever loading with the pipette tips. In this case, a few of the first or last channels (111) are occupied with tips, wherein the actual number of tips is determined in advance. In this way, such a multi-channel pipettor (1) can use a different number of channels (111) in each transfer block, and also serve non-rigid grids. The aim of optimization consists in assigning the largest possible areas of the same channel arrangement to each other on the source and destination platforms, or the first container holder (120) and the second container holder (130). This aim can be achieved by appropriately modifying the procedure already described:

Sequences of samples to be transferred in the first movement direction (BW1), which, starting with the first channel (111) or ending with the last channel, can be reached simultaneously without gaps, are determined for each access point in the second movement direction (BW2). In the respective access point in the second movement direction (BW2), the sample sequence with the highest access length and shortest path is determined, and used in the subsequent step. If the procedure is completed for all access points in the second movement direction (BW2) for both source and destination positions, sample sequences of equal access length and channel arrangement on both platforms, i.e., on the first container holder (120) and the second container holder (130), are assigned to each other. The associated samples to be transferred are removed from the source and destination lists, and the corresponding accesses are recorded in the access plan. The procedure is updated for the remaining samples to be transferred for source containers (121) and destination containers (131). The procedure is repeated as long as direct assignment is possible. Thereafter, the longest, non-recorded source and destination areas are assigned to each other, and adapted to each other in terms of length. The corresponding samples to be transferred are removed from the search list. The entire procedure is repeated until the assignment of all samples to be transferred is completed.

This procedure is used for free access, without or with spatial constraint. In the case of a linked transfer, in addition to the channel sequences, the assigned indices of samples to be transferred are also compared.

The invention claimed is:
1. A method for operating a multi-channel pipettor, wherein the multi-channel pipettor includes a pipetting head and a first container holder having a plurality of source containers and a second container holder having a plurality of destination containers, or a third container holder having a plurality of source and destination containers, wherein the pipetting head has a plurality of channels which are arranged in a matrix having a first dimension larger than a second dimension, wherein the channels are designed to accommodate pipette tips, and wherein the pipetting head and the first and second container holders or the third container holder are movable relative to each other in a two-dimensional plane defined by a first movement direction in the first dimension of the matrix and a second movement direction in the second dimension of the matrix, and in a third movement direction intersecting the two-dimensional plane, wherein the multi-channel pipettor further includes a control electronics, the method comprising:
  creating an access plan including a plurality of transfer blocks, wherein each transfer block defines a transfer of a defined amount of liquid for at least one of the channels via a source access and a destination access, wherein the source access defines a step of accessing one of the plurality of source containers in which the channel moves to a source position on the two-dimensional plane and receives the defined amount of liquid from the source container, and wherein the destination access defines a step of accessing one of the plurality of destination containers in which the channel moves to a destination position on the two-dimensional plane and delivers the defined amount of liquid to the destination container, wherein the creating includes:
  reading position lists that contain the local positions of all source and destination containers;
  performing a transfer analysis in which the source accesses or the destination accesses and the movements of the pipetting head and/or the first and second container holders or the third container holder required for an access are determined by forming a difference between the current channel position and the source position or the destination position on the two-dimensional plane; and
  performing a transfer optimization, whereby the source or destination accesses and the movements of the pipetting head respectively required for the source or destination accesses are sorted into the transfer blocks such that a length of a movement path is minimized and the number of transfers of the defined amounts of liquids in one transfer block is maximized; and
  operating the multi-channel pipettor via its control electronics using the created access plan, wherein the multichannel pipettor processes in succession the transfer blocks included in the access plan.
2. The method according to claim 1, further comprising:
  checking in the course of the transfer analysis whether each of the source and destination containers can be reached by each of the channels by respectively moving the pipetting head and/or the container holders in the first movement direction and in the second movement direction.

3. The method according to claim 2, wherein when each of the source and destination containers can be reached by each of the channels by respectively moving the pipetting head and/or the container holders in the first movement direction and in the second movement direction, the method further comprises:
forming from a quotient of the number of destination containers and the number of channels the number of transfer blocks in the access plan.

4. The method according to claim 2, wherein when not each of the source and destination containers can be reached by each of the channels by respectively moving the pipetting head and/or the container holders in the first movement direction and in the second movement direction, the method further comprises:
creating a list for all source or destination containers, which list respectively contains those channels from which the respective source or destination container can be reached, wherein the number of channels listed in a list is assigned to the respective source or destination container as a reachability index.

5. The method according to claim 4, wherein source and/or destination containers having a reachability index below a predetermined magnitude are respectively assigned to one of the channels included in the respective list of source and/or destination containers.

6. The method according to claim 1, wherein, for source and/or destination containers which are dimensioned such that simultaneous source or destination access of several channels can take place, the method further comprises:
determining in the course of the transfer analysis a minimum and a maximum container extension in each of the two movement directions.

7. The method according to claim 6, further comprising:
determining, in the second movement direction, access positions in which at least two of the source and/or destination containers which allow simultaneous source or destination access of several channels overlap.

8. The method according to claim 6, further comprising:
determining, in the first movement direction, access positions with the aid of which each container is simultaneously reached by at least one predetermined subset of channels adjacent in the first movement direction.

9. The method according to claim 6, further comprising:
calculating a centroid position and a tolerance range in the first movement direction and in the second movement direction in the course of the transfer optimization for each of the source and/or destination containers which allow simultaneous source or destination access of several channels, wherein the centroid position represents the center of the distance between the minimum and maximum container extensions in a movement direction, and wherein the tolerance range represents half the difference between the maximum and minimum container extensions in a movement direction.

10. The method according to claim 9, further comprising:
checking for each of the channels whether, in the first and in the second movement directions, the distance between the current channel position and the centroid position of the containers from an access position respectively is smaller than the tolerance range, wherein only those access positions for which this is the case are sorted into the transfer blocks.

11. The method according to claim 1, wherein the pipetting head is equipped in advance with a number of pipette tips which is smaller than the number of channels.

12. The method according to claim 11, further comprising:
for each access position in the second movement direction, determining a number of reachable source and destination containers for each of the channels using simulated movement of the pipetting head or the container holders in the first movement direction.

13. The method according to claim 11, wherein the access position in the second movement direction with the respectively highest number of possible source or destination accesses via the first movement direction is respectively determined for the source and destination containers, wherein the access position determined for the source access is assigned to the access position determined for the destination access, and these accesses are sorted into a transfer block, wherein the number of possible source or destination accesses in the access positions is identical.

14. The method according to claim 13, further comprising:
repeating the method steps of determining the access positions with the highest number of source or destination accesses and the assignment until it is no longer possible to assign access positions with identical numbers of possible source and destination accesses, in which case the access positions with the respectively highest number of source accesses are assigned to the access positions with the respectively highest number of destination accesses.

15. A multi-channel pipettor, comprising:
a control electronics;
a pipetting head;
a first container holder having a plurality of source containers; and
a second container holder having a plurality of destination containers;
wherein the pipetting head includes a plurality of channels arranged in a matrix having a first dimension and a second dimension, wherein the plurality of channels are embodied to accommodate pipette tips, wherein the first dimension of the matrix has a larger number of channels than the second dimension of the matrix, and wherein the pipetting head, the first container holder, and the second container holder are movable relative to each other in a two-dimensional plane defined by a first movement direction in the first dimension of the matrix and a second movement direction in the second dimension of the matrix and in a third movement direction intersecting the two-dimensional plane, and
wherein the multi-channel pipettor is configured via its control electronics to:
create an access plan including a plurality of transfer blocks, wherein each transfer block defines a transfer of a defined amount of liquid for at least one of the channels via a source access and a destination access, wherein the source access defines a step of accessing one of the plurality of source containers in which the channel moves to a source position on the two-dimensional plane and receives the defined amount of liquid from the source container, and wherein the destination access defines a step of accessing one of the plurality of destination containers in which the channel moves to a destination position on the two-dimensional plane and delivers the defined amount of liquid to the destination container, wherein the creating includes:
reading position lists that contain the local positions of all source and destination containers;
performing a transfer analysis in which the source accesses or the destination access and the movements of the pipetting head and/or the first and second container holders or the third container holder required for an access are determined by forming a difference between the current channel position and the source position or the destination position on the two-dimensional plane; and
performing a transfer optimization, whereby the source or destination accesses and the movements of the pipetting head respectively required for the source or destination accesses are sorted into the transfer blocks such that a length of a movement path is minimized and the number of transfers of the defined amounts of liquids in one transfer block is maximized; and
process in succession the transfer blocks included in the access plan.

* * * * *